(12) United States Patent
Hoisington

(10) Patent No.: US 11,640,715 B2
(45) Date of Patent: May 2, 2023

(54) BIRDS EYE VIEW CAMERA FOR AN ASPHALT PAVER

(71) Applicant: Caterpillar Paving Products Inc., Brooklyn Park, MN (US)

(72) Inventor: Kent A Hoisington, Mound, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/353,560

(22) Filed: Jun. 21, 2021

(65) Prior Publication Data
US 2022/0405516 A1 Dec. 22, 2022

(51) Int. Cl.
G06V 20/58 (2022.01)
B60W 50/14 (2020.01)
B60R 11/04 (2006.01)

(52) U.S. Cl.
CPC .............. *G06V 20/58* (2022.01); *B60R 11/04* (2013.01); *B60W 50/14* (2013.01); *B60W 2050/143* (2013.01)

(58) Field of Classification Search
CPC ......... G06V 20/58; B60R 11/04; B60W 50/14
See application file for complete search history.

(56) References Cited

U.S. PATENT DOCUMENTS

| | | | |
|---|---|---|---|
| 10,293,751 B2 | 5/2019 | Izumikawa | |
| 10,378,162 B2 | 8/2019 | Kroll et al. | |
| 10,407,844 B1* | 9/2019 | Nelson | E01C 19/48 |
| 2010/0194886 A1 | 8/2010 | Asari et al. | |
| 2014/0371988 A1* | 12/2014 | Muramatsu | B60W 40/105 701/41 |
| 2017/0079195 A1* | 3/2017 | Yokoyama | A01B 69/00 |
| 2018/0281681 A1* | 10/2018 | Sunohara | H04N 7/18 |
| 2019/0347000 A1* | 11/2019 | Marsolek | G06F 3/04847 |
| 2021/0009038 A1* | 1/2021 | Sakakibara | B60Q 5/005 |

FOREIGN PATENT DOCUMENTS

| | | | |
|---|---|---|---|
| CN | 105862556 | | 8/2016 |
| CN | 106049243 | | 2/2019 |
| CN | 110042735 | | 7/2019 |
| CN | 110853387 | | 2/2020 |
| CN | 110983914 | * | 4/2020 |
| CN | 212302504 | | 1/2021 |
| DE | 102015002692 | | 9/2016 |
| EP | 3064646 | | 9/2016 |
| KR | 101789294 | | 11/2017 |

* cited by examiner

Primary Examiner — Kathleen V Nguyen
(74) Attorney, Agent, or Firm — Schwegman, Lundberg & Woessner

(57) ABSTRACT

A display system for a paving machine can include a plurality of cameras configured to provide a 360° bird's-eye view of a paving machine and an area surrounding the paving machine; a display operatively coupled to the plurality of cameras showing the 360° bird's-eye view; and a controller coupled to the display, the controller further coupled to a sensor on the paving machine positioned to measure a height of a paving material at one or more locations on the paving machine, wherein when the material height falls below a pre-determined level, the controller sends a warning to the display such that the display shows the 360° bird's-eye view with the material height warning incorporated into the display.

16 Claims, 4 Drawing Sheets

BIRDS EYE VIEW CAMERA FOR AN ASPHALT PAVER

TECHNICAL FIELD

The present disclosure generally relates to an asphalt paving machine. More particularly, the present disclosure relates to a paving machine having a camera view.

BACKGROUND

Asphalt paving machines are used to apply, spread and compact paving material relatively evenly over a desired surface. These machines are regularly used in the construction of roads, parking lots and other areas where a smooth durable surface is required for cars, trucks and other vehicles to travel. An asphalt paving machine generally includes a hopper for receiving asphalt material from a truck and a conveyor system for transferring the asphalt rearwardly from the hopper for discharge onto a roadbed. Screw augers can be used to spread the asphalt transversely across the roadbed in front of a screed plate. The screed plate smooths and somewhat compacts the asphalt material and ideally leaves a roadbed of uniform depth and smoothness.

When operating an asphalt paving machine, it is often hard to see everything that is going on around the machine. The operator needs to watch multiple things like machine direction, obstacles, and material flow through the paver. In order to do this the operator needs to constantly look in many different directions and, in many cases, visibility is not the best.

CN 10042735 discusses an unmanned intelligent paver control system including an obstacle avoidance unit.

SUMMARY

In an example according to this disclosure, a display system for a paving machine can include a plurality of cameras configured to provide a 360° bird's-eye view of a paving machine and an area surrounding the paving machine; a display operatively coupled to the plurality of cameras showing the 360° bird's-eye view; and a controller coupled to the display, the controller further coupled to a sensor on the paving machine positioned to measure a height of a paving material at one or more locations on the paving machine, wherein when the material height falls below a pre-determined level, the controller sends a warning to the display such that the display shows the 360° bird's-eye view with the material height warning incorporated into the display.

In one example, a method of providing an operator information during operation of a paving machine can include mounting a plurality of cameras configured to provide a 360° bird's-eye view of a paving machine and an area surrounding the paving machine; displaying the 360° bird's-eye view on a display that is operatively coupled to the plurality of cameras; and displaying a paving material height warning on the display at one or more locations on the paving machine when the paving material height falls below a pre-determined level.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
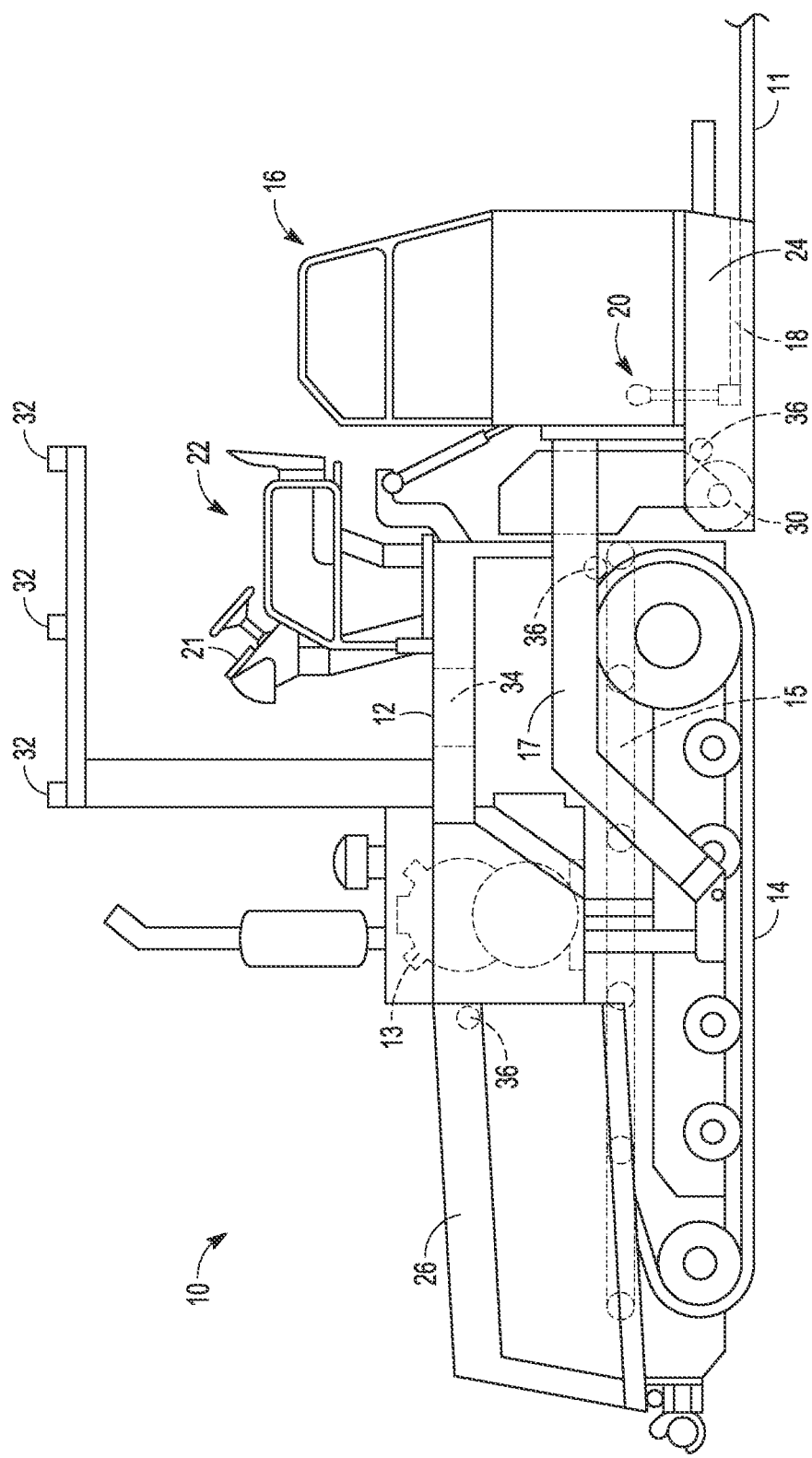
FIG. 1 shows a side view of a paving machine, in accordance with one embodiment.

FIG. 1 shows a side view of a paving machine 10 in accordance with one embodiment. The paving machine 10 generally includes a frame 12 with a set of ground-engaging elements 14 such as tracks or wheels coupled with the frame 12. The ground-engaging elements 14 may be driven by an engine 13 in a conventional manner. A screed assembly 16 can be positioned at the rear end of the paving machine 10 to spread and compact paving material into an asphalt mat 11 having a desired thickness, size, uniformity, crown profile and cross slope. The paving machine 10 also includes an operator station 22 having a seat and a console, which includes a display 21 and various controls for directing operations of the paving machine 10.

The paving machine 10 further includes a hopper 26 for storing a paving material, and a conveyor system including one or more conveyors 15 configured to move paving material from the hopper 26 to the screed assembly 16 at the rear of the paving machine 10. One or more augers 30 are arranged near the forward end of the screed assembly 16 to receive the paving material supplied by the conveyor 15 and spread the material evenly beneath the screed assembly 16.

Reference to the "forward" end of the screed assembly 16 means the end of screed assembly 16 facing in the direction of travel of paving machine 10 as paving machine 10 is applying the paving material to a surface (to the left in FIG. 1). Similarly, reference to a "forward-facing" surface of a component of screed assembly 16 means a surface facing in the direction of travel of paving machine 10 while paving machine 10 is applying paving material to a surface, while reference to an "aft-facing" surface of a component means a surface facing away from the direction of travel of paving machine 10 while paving machine 10 is applying paving material to a surface (to the right in FIG. 1).

The screed assembly 16 can be pivotally coupled behind the paving machine 10 by a pair of tow arms 17 that extend between the frame 12 of the paving machine and the screed assembly 16. The tow arms 17 can be pivotally connected to the frame 12 such that the relative position and orientation of the screed assembly 16 relative to the screed frame and to the surface being paved may be adjusted by pivoting the tow arms 17, for example, in order to control the thickness of the paving material deposited by the paving machine 10.

The screed assembly 16 can include a screed frame 24 with a screed plate 18 coupled to the screed frame 24. The screed plate 18 is configured to float on the paving material of the asphalt mat 11 laid upon a prepared paving bed and to "smooth" or level and compact the paving material on the base surface, such as for example a roadway or roadbed.

The screed assembly 16 can include a tamper bar assembly 20 positioned forward of the screed plate 18 and extending transversely to the direction of travel of the paving machine 10. The tamper bar assembly 20 can pre-compact the paving material as the paving machine 10 moves forward and the screed assembly 16 smooths the paving material to remove air pockets and other voids to create a flat, paved surface.

As noted above, when operating an asphalt paver, it is often hard to see everything that is going on around the machine. The operator needs to watch multiple things like truck interface, machine direction, obstacles, and material flow through the paver. In order to do this the operator needs to be constantly look in many different directions and, in many cases, visibility is not the best.

Not being able to clearly see everything that is going on around the job site can lead to running into an obstacle, damaging the machine or property. Not being able to adequately see material flow can lead to too much or too little material delivered to the screed leading to mat defects. Not being able to see the path in front of the paver make it hard for the paver operator to steer the paver on an even path.

The present system integrates the use of a camera display system that can provide a bird's eye view of the paver and the jobsite surrounding the paver.

For example, the display system for the paving machine 10 can include a plurality of cameras 32 mounted to the machine and configured to provide a 360° bird's-eye view of the paving machine 10 and an area surrounding the paving machine 10. For example, the view can include the are immediately surrounding the paving machine 10 and the paving path of the paving up to 50 feet in front of the paving machine 10.

The machine further includes the display 21 operatively coupled to the plurality of cameras 32 showing the 360° bird's-eye view. The display 21 can be located in the operator station, for example. The machine 10 further includes a controller 34 coupled to the display 21. The controller 34 can be coupled to one or more sensors 36 on the paving machine 10. The sensors 36 can include material heights sensors and temperature sensors. The sensors 36 can be positioned to measure a height of a paving material or a temperature of the paving material at one or more locations on the paving machine 10.

In various embodiments, the camera system will show on the display 21 the locations of bystanders present in the work zone, physical obstacles such as curbs and manholes in the drive path, the locations of other machines moving on the jobsite, allow the operator to see how much material is in the truck, the hopper and in the auger tunnel, and allow the operator to see the paver path.

Figure 2:
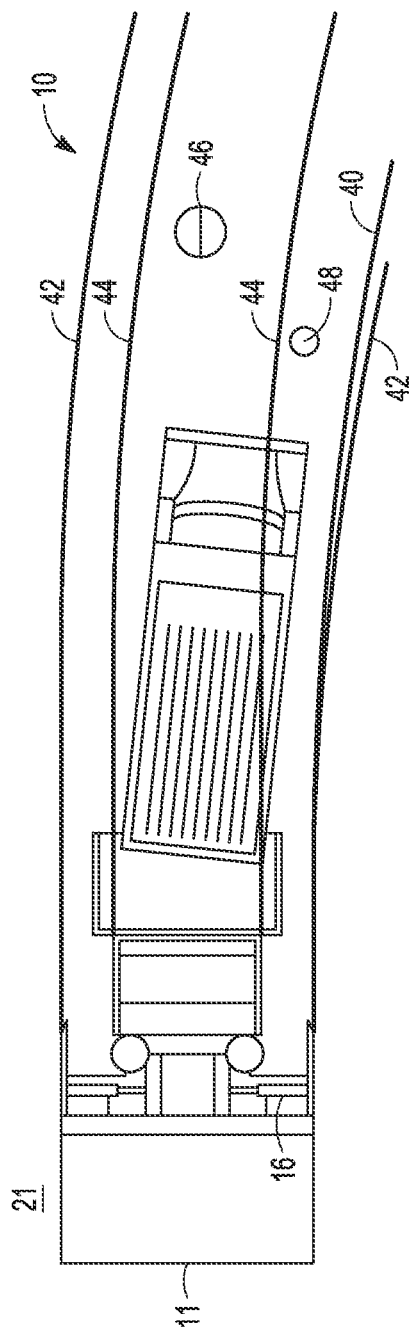
FIG. 2 shows a view of a display, in accordance with one embodiment.

FIG. 2 shows an example of a view of the display 21. The display 21 can be operatively coupled to the plurality of cameras 32 (FIG. 1) showing the 360° bird's-eye view on the display 21 as shown in FIG. 2. The controller 34 can be further coupled to the display 21 and superimpose various features onto the display to give the operator information about the paving process. For example, here the display 21 shows a paving path of the paving machine 10 superimposed or incorporated into the bird's eye view. The paving path can include two components, a machine path 44 which shows the travel path of the machine 10 itself, and the screed path 42, which shows the path of the asphalt mat 11 being laid down. The machine path 44 and the screed path 42 can be determined by the controller 34 based on present location, machine speed, and the steering angles of the machine 10, for example.

In this example, the operator can see a curb 40 on the display and determine to change the machine path 44 or the screed length to alter the screed path 42 to align with the curb 40. In other examples, the display can further show steering guidelines displaying a desired drive path and the operator can attempt to replicate the desired path by using the actual drive path as a guide.

The bird's eye view on the display 41 can also show the operator that there may be obstacles such as bystanders, animals, a water valve cover 48, or a manhole cover 46 in or near the paving path.

Figure 3:
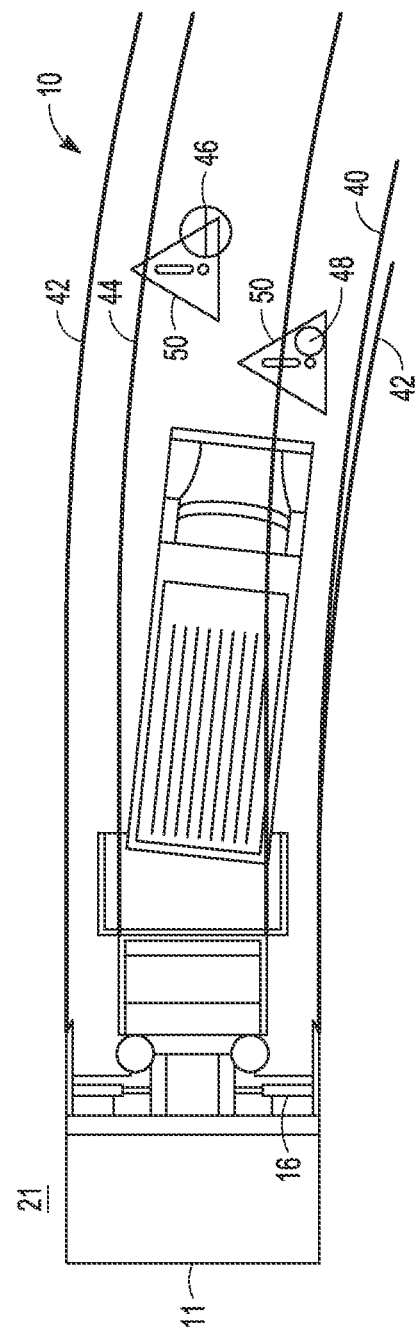
FIG. 3 shows a view of the display, in accordance with one embodiment.

FIG. 3 shows an example of a view of the display 21. Here, the display 21 highlights the obstacles such as the manhole cover 46 and the water valve cover 48 in or near the paving path by showing a highlight marker 50 on the display 21 at the locations of the manhole cover 46 and the water valve cover 48.

In one example, the controller 34 can determine that such obstacles are in the paving path if the controller determines there is an anomaly in the view received from the cameras 32 and can highlight the anomaly with the markers 50 overlayed onto the display 21. In various examples, the anomaly might be a manhole cover, a person, an animal, or other item. Highlighting the obstacle can help the operator prevent damage to the machine 10 or the screed assembly 16 and damage to the surrounding environment. In other examples, the locations of known landmarks such as manhole covers can be pre-loaded into the controller and the locations determined using a GPS system or other object detection methods such as lidar. The controller can add a highlight marker 50 on the display 21 based on that information.

Figure 4:
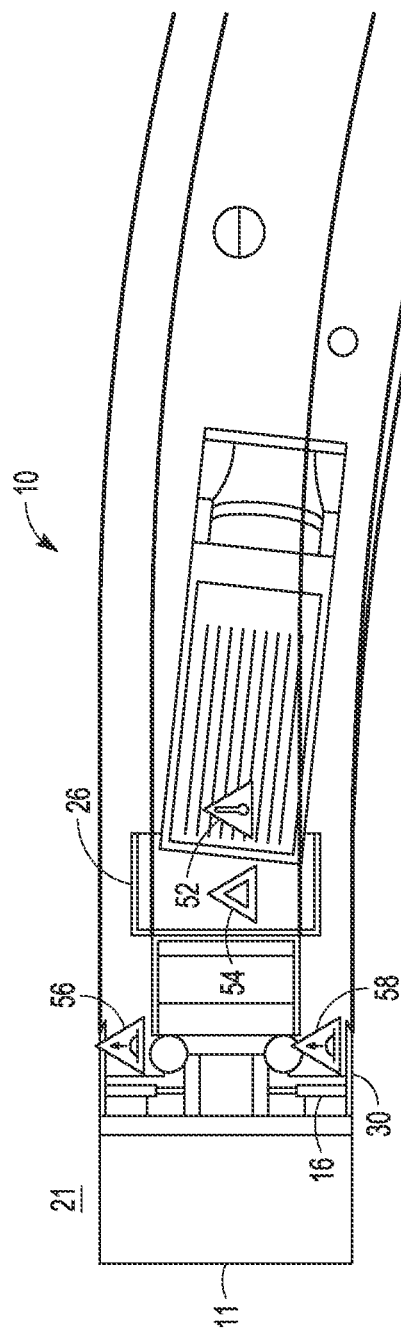
FIG. 4 shows a view of the display, in accordance with one embodiment.

FIG. 4 shows another example of a view of the display 21. As shown, the display 21 shows the paving material in the truck including in the hopper 26 and at the auger 30 on the display 21 to the operator. In this example, the controller is further coupled to the sensors 36 (FIG. 1) on the paving machine 10 which are positioned to measure a height and/or temperature of a paving material at one or more locations on the paving machine 10. In one example, the controller 34 can send the height information to the display 21 such that the display shows the 360° bird's-eye view with the material height information at the various locations incorporated into the display 21. For example, the height information can be shown in the hopper 26 or at the auger 30. In one example, the material height information can be shown at either end of the auger 30. In one example, if the controller 34 determines that the material height is below a certain predetermined level, the controller 34 can send a material height warning 54, 56, 58 to the display 21 so as to alert the operator.

Likewise, in one example, a temperature of the paving material at various locations can be shown on the display 21. In one embodiment, if the controller determines that the paving material temperature is out of a pre-determined range, a temperature warning 52 can be shown on the display 21. The pre-determined range can be entered into the controller 34 manually or can be calculated by the controller 34 based on ambient temperature and the material specifications, for example.

Accordingly, if equipped with the material height and the temperature sensors 36 a warning can be displayed when the material height in the hopper or at the auger 30 are low or when the paving material temperature is below specification. This can help prevent paving mat 11 defects.

Figure 5:
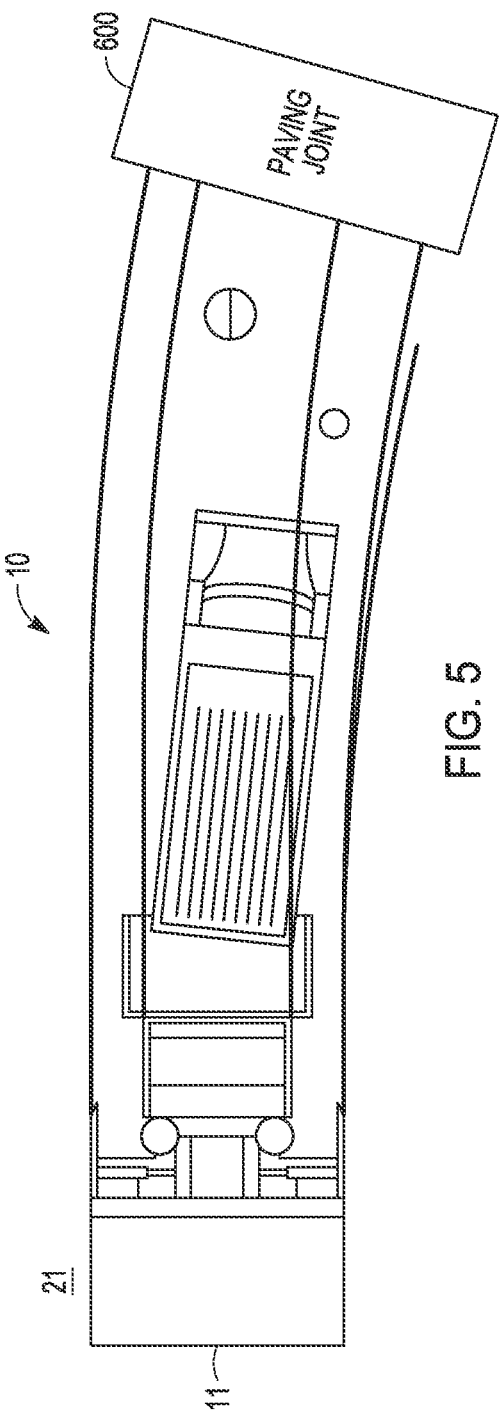
FIG. 5 shows a view of the display, in accordance with one embodiment.

FIG. 5 shows another example of a view of the display 21. Here, the display 21 shows the operator a distance to travel before an end of a paving job at a paving joint 60. Based on a desired depth of paving mat and the display 21 showing the length until end of a paving job the operator can determine how much more material is needed and when the paving material feed of the machine 10 should be shut off. Being able to see the paving joint 60 helps the tractor operator to determine when the material feed system should be turned off. If it is turned off to soon there will not be enough material causing a dip. If it is turned off too late the ground crew will be shoveling the excess paving material. Being able to better see the paving machine and the job site can allow the operator to manage paving material at the end of a pull, minimizing the pile which reduces the amount of material the crew needs to shovel.

In one example, the controller 34 can be given the desired depth of mat and can determine the length until end of the paving job from the camera view and the controller 34 can be configured to determine the optimal time to shut off the paving material supply flow automatically based on the volume of paving material needed to properly finish the job.

In other examples of the present system, the display 21 can be located on the screed assembly 16 of the paving machine 10. If the bird's-eye view is integrated into the screed assembly 16 it could allow the machine to be controlled from the screed eliminating the need for a tractor operator.

In some examples, the display can be off-site of the paving machine 10, and the machine 10 can be controlled remotely or autonomously.

INDUSTRIAL APPLICABILITY

The present system is applicable to paving systems such as asphalt paving machines. As discussed above, in certain circumstances it can be difficult to see everything going on around an asphalt paver during operation.

The present system integrates a plurality of cameras 32 on the paving machine 10 to create a 360° birds-eye view around the paver and displaying that image to the operator. The image may show locations of bystanders within a work zone, physical obstacles such as curbs or manholes, and allows the operator to see how much material is in the truck, the hopper, and the auger tunnel. Warning symbols can be provided for objects detected. Additionally, the paver path with steering guidelines and the screed path can be shown. Paving material height on the paving machine 10 and paving material temperature may also be monitored and displayed and warnings can be displayed if needed.

Figure 6:
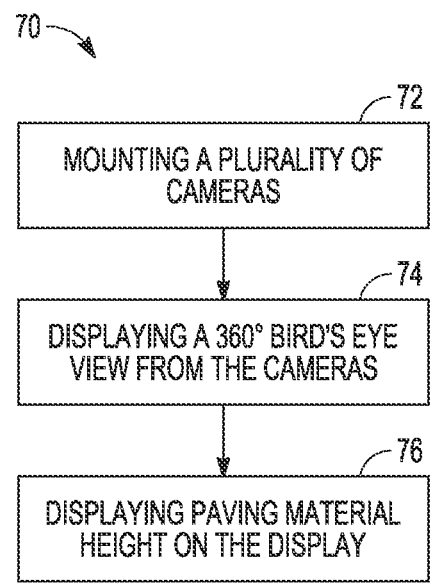
FIG. 6 shows a flowchart of a method of providing an operator information during operation of a paving machine, in accordance with one embodiment.

FIG. 6 shows a method (70) of providing an operator information during operation of a paving machine. The method 70 can include mounting a plurality of cameras (72) configured to provide a 360° bird's-eye view of a paving machine and an area surrounding the paving machine; displaying the 360° bird's-eye view on a display (74) that operatively coupled to the plurality of cameras; and displaying a paving material height warning (76) on the display at one or more locations on the paving machine when the paving material height falls below a pre-determined level.

In one or more examples, the display can show a paving path of the paving machine, and the display can show obstacles in or near the paving path, and the controller 34 can highlight the obstacles on the display. The display can show the paving material in the truck including in the hopper and at the auger and the material heights can be displayed on the display at both locations. Further a temperature of the paving material at both locations is further shown on the display, and warning can be displayed if the height or temperatures are below a specification.

The display can show a distance to travel before an end of a paving job. In some examples, the controller can be given a depth of paving mat and a length until end of the paving job and can be configured to determine the optimal time to shut off the paving material supply flow.

The present system allows the operator to have a better view to clearly see everything that is going on around the job site to prevent running into an obstacle. Also, the operator can more adequately see the paving material flow so that the right amount of paving material is delivered to the screed thus preventing mat defects. Moreover, being able to see the path in front of the paver make it easier for the paver operator to steer the paver on an even path.

Being able to better seethe paver and the job site will allow the operator to manage material at the end of a pull, minimizing the pile which reduces the amount of material the crew needs to shovel.

Moreover, having a bird's eye view display on the screed could also allow the paver to be operated from the screed with added controls. This would eliminate the need for a paver operator.

The above detailed description is intended to be illustrative, and not restrictive. The scope of the disclosure should, therefore, be determined with references to the appended claims, along with the full scope of equivalents to which such claims are entitled.

What is claimed is:

1. A display system for a paving machine comprising:
a plurality of cameras configured to provide a 360° bird's-eye view of a paving machine and an area surrounding the paving machine;
a display operatively coupled to the plurality of cameras showing the 360° bird's-eye view; and
a controller coupled to the display, the controller further coupled to a sensor on the paving machine positioned to measure a height of a paving material at one or more locations on the paving machine, wherein when the paving material height falls below a pre-determined level, the controller sends a warning to the display such that the display shows the 360° bird's-eye view with a material height warning incorporated into the display, wherein the display shows a distance to travel before an end of a paving job, wherein the controller is given a depth of mat and a length until end of the paving job and is configured to determine an optimal time to shut off a paving material supply flow; and
wherein the display shows a predicted paving path of the paving machine based on a current position and steering angle of the paving machine and the display also shows a second, desired paving path.

2. The display system of claim 1, wherein the display shows one or more obstacles in or near the paving path and the controller highlights the one or more obstacles on the display.

3. The display system of claim 1, wherein the display shows the paving material in the paving machine including in a hopper and at an auger and paving material heights are displayed on the display at both locations.

4. The display system of claim 3, wherein a temperature of the paving material at both locations is monitored by the controller and a temperature warning is shown on the display if the paving material temperature is out of a pre-determined range.

5. A display system for a paving machine comprising:
 a plurality of cameras configured to provide a 360° bird's-eye view of a paving machine and an area surrounding the paving machine;
 a display operatively coupled to the plurality of cameras showing the 360° bird's-eye view; and
 a controller coupled to the display, the controller further coupled to a sensor on the paving machine positioned to measure a height of a paving material at one or more locations on the paving machine, wherein when the paving material height falls below a pre-determined level, the controller sends a warning to the display such that the display shows the 360° bird's-eye view with a material height warning incorporated into the display, wherein the display shows a distance to travel before an end of a paving job, wherein the controller is given a depth of mat and a length until end of the paving job and is configured to determine an optimal time to shut off a paving material supply flow.

6. The display system of claim 5, wherein the display is in an operator station of the paving machine.

7. The display system of claim 5, wherein the display is on a screed assembly of the paving machine.

8. The display system of claim 5, wherein the display is off-site of the paving machine.

9. A method of providing an operator information during operation of a paving machine, the method comprising:
 mounting a plurality of cameras configured to provide a 360° bird's-eye view of a paving machine and an area surrounding the paving machine;
 displaying the 360° bird's-eye view on a display that is operatively coupled to the plurality of cameras; and
 displaying a paving material height warning on the display at one or more locations on the paving machine when the paving material height falls below a pre-determined level; and
 wherein the display shows a distance to travel before an end of a paving job, wherein a controller is given a depth of mat and a length until end of the paving job and is configured to determine an optimal time to shut off a paving material supply flow.

10. The method of claim 9, wherein the display showing a paving path of the paving machine.

11. The method of claim 10, wherein the display shows obstacles in or near the paving path and a controller highlights the obstacles on the display.

12. The method of claim 9, wherein the display shows the paving material in the paving machine including in a hopper and at an auger and the material heights are displayed on the display at both locations.

13. The method of claim 12, wherein a temperature of the paving material at both locations is monitored by a controller and a temperature warning is shown on the display if the paving material temperature is out of a pre-determined range.

14. The method of claim 9, wherein the display is in an operator station of the paving machine.

15. The method of claim 9, wherein the display is on a screed assembly of the paving machine.

16. The method of claim 9, wherein the display is off-site of the paving machine.

* * * * *